United States Patent [19]

Chaney et al.

[11] 4,041,678
[45] Aug. 16, 1977

[54] SHORT TURN VEHICLE

[76] Inventors: Ray Owen Chaney; Emsley M. Chaney, both of R.R. No. 2, Sidney, Ohio 45365

[21] Appl. No.: 611,399

[22] Filed: Sept. 8, 1975

[51] Int. Cl.² .......................................... A01D 35/26
[52] U.S. Cl. ..................................... 56/10.7; 56/15.8;
56/DIG. 22; 180/21
[58] Field of Search ................... 56/10.7, 10.8, 11.4,
56/11.9, 15.4, 15.7, 15.8, DIG. 22; 180/21, 26 A, 66 R

[56] References Cited
U.S. PATENT DOCUMENTS

| | | | |
|---|---|---|---|
| 2,942,677 | 6/1960 | Gray | 180/26 A |
| 3,298,453 | 1/1967 | Bobard | 180/21 |
| 3,630,010 | 12/1971 | Rester | 56/15.8 X |
| 3,680,292 | 8/1972 | McCanse | 56/15.8 |
| 3,700,059 | 10/1972 | Sutton | 180/21 X |
| 3,777,459 | 12/1973 | Elliott | 56/DIG. 22 |

*Primary Examiner*—Jay N. Eskovitz
*Attorney, Agent, or Firm*—W. Preston Hickey

[57] ABSTRACT

A "short turn" vehicle having front and rear, centerline mounted, power driven, steerable wheels, and a pair of outrigger stabilizing wheels that are mounted on a rigid frame which is restrained against all but vertical movement relative to the frame. The vehicle is capable of zero radius turns under full load. The vehicle is ideally suited as a conveyance of rotary mowers since the vehicle's wheels "guard" the rotary mowing unit and three preferred arrangements thereof are shown and described.

19 Claims, 5 Drawing Figures

SHORT TURN VEHICLE

BACKGROUND OF THE INVENTION

Ever since motor driven vehicles have replaced draft animals for tilling the soil, a need has existed for a vehicle at least a portion of which can move laterally, and the whole vehicle of which can turn about a point falling within the confines of the vehicle. When cultivating row crops for example, any implement must come to the end of the row and then turn and go back the adjacent row. All tractors with which we are familiar, require a considerable radius which exceeds the length of the tractor with the result that it has been necessary to cultivate and plant rows at the ends of the field which run perpendicular to the main rows running lengthwise of the field. It is necessary, therefore, for the tractor to drive over some of the end perpendicular rows when cultivating lengthwise of the field, and a certain amount of the crop is lost or damaged by the wheels of the tractor used in cultivating.

A similar situation exists in vehicles used to carry or draw lawn mowers over the terrain, particularly where the mower is supported from or drawn behind the rear of the vehicle. Rotary lawn mowers have become extensively used, and in many instances the rotary mowers have been mounted directly below the frame of the tractor which supports the rotary mower. All commercial machines with which we are aware require a considerable turning radius in order for the vehicle to turn around and make another pass over the terrain with the result that there are areas at the ends of the plot being mowed which are not cut when the vehicle turns around, and which must be cut by a passage of the vehicle transversely across the main length of the plot. In such instances, the wheels of the vehicle flatten some of the grass before it is mowed, with the result that a short time after mowing the grass which has been flattened by the wheels of the vehicle become erect again to leave uncut wheel marks.

Still further difficulties exist with existing mowers, in that they dig into the terrain when the vehicle traverses a high spot or knoll. This is particularly true with vehicles having the usual front and rear pairs of wheels; and in those instances where the frames are rigid, one or more wheels may leave the ground to leave areas of grass which are high and other areas which have been removed to the bare ground.

Still other problems exist in farm vehicles which perform work relative to objects supported or raised on the ground over which the vehicle passes; so that there is no question that a need for a vehicle that can turn about a point within the confines of the vehicle has existed for a long time. It is equally clear that no such device has been produced heretofore which is sufficiently workable as to warrant commercial production.

An object of the invention therefore is the provision of a new and improved ground vehicle that is self-propelled and which can turn about a point within the confines of the vehicle.

Another object of the present invention is the provision of a new and improved self-propelled mower which can move up to an object and at least a portion of which can move laterally relative thereto to thereby trim around objects.

A further object of the invention is the provision of a new and improved self-propelled short turn land vehicle the ends of which can be made to move laterally.

Further objects and advantages of the invention will come become apparent to those skilled in the art to which the invention relates from the following description of several preferred embodiments which are described with reference to the accompanying drawings.

DESCRIPTION OF THE PREFERRED EMBODIMENTS

While the present invention may be embodied in land vehicles for many different uses, it is herein shown and described as being embodied in a vehicle having a lawn mower suspended midframe of the vehicle.

Figure 1:
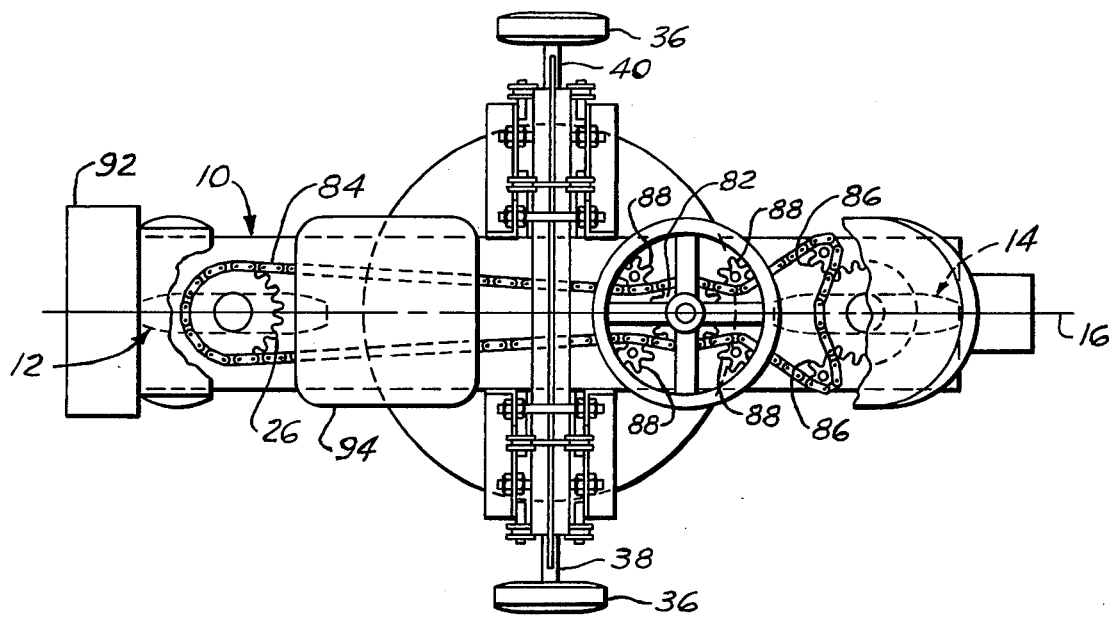
FIG. 1 is a schematic plan view showing the construction and general arrangement of a vehicle embodying principles of the present invention.
Figure 2:
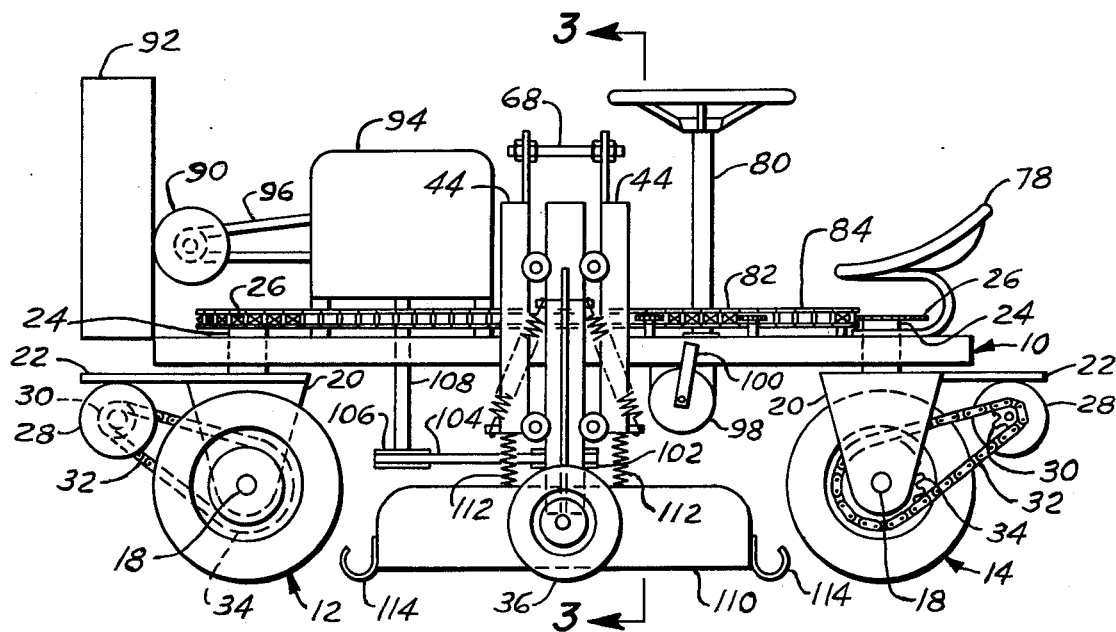
FIG. 2 is a somewhat schematic side elevational view of the vehicle shown in FIG. 1.
Figure 3:
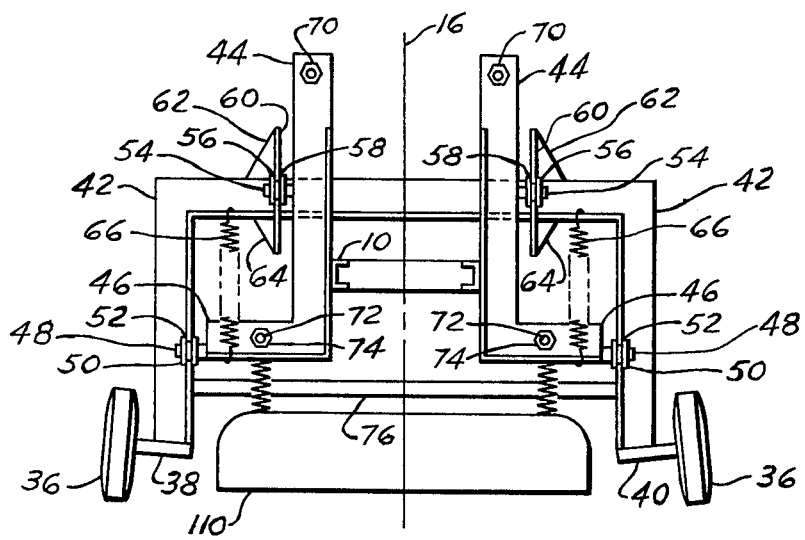
FIG. 3 is a cross sectional view taken approximately on the line 3—3 of FIGS. 1 and 2.

The embodiment shown in FIGS. 1 through 3 of the drawings generally comprises a rigid rectangular frame 10 made of channel iron. Front and rear power driven wheels 12 and 14, respectively, are supported in tandem arrangement on the longitudinal center line 16 of the rectangular frame 10. The front and rear wheels 12 and 14 are supported and driven by identical structures only one of which will be described in detail. The front wheel 12 is journaled on a stub axle 18 that is fixed to the bottom of a vertical plate 20 and the top edge of which is welded to the bottom of a horizontal motor suport plate 22. A vertical tubular stub shaft 24 is welded to the top of the plate 22 directly above the wheel 12; and the tubular stub shaft 24 is journaled to the front of the rectangular frame for turning movement about a vertical axis. An annular steering sprocket 26 is fastened to the top end of the tubular stub shaft 24, and the sprocket 26 is turned by structure which will later be described in detail. The front wheel 12 is driven by a hydraulic motor 28 that is suitably fastened to the bottom of the motor support plate 22. A drive sprocket 30 is fixed to the driven shaft of the motor, which sprocket 30 in turn drives an endless chain 32 which in turn drives a driven sprocket 34 that is fixed to the front power driven wheel 12 of the vehicle. As previously indicated the rear power driven wheel 14 is supported and driven by identical structures.

The vehicle shown in the drawing also comprises a pair of outrigger, or balance, wheels 36 for holding the vehicle in an upright position relative to the terrain over which the vehicle is driven. The outrigger wheels 36 are journaled on short horizontal stub axles 38 and 40, respectively, which are welded to the bottom of an inverted U-shaped frame member 42 that is made of T-iron, and which bridges over the top of the rectangular frame 10. In the embodiment shown, the outrigger wheels 36 have approximately 5° camber for better stability on hilly terrain. The inverted U-shaped frame member 42 is guided for vertical movement relative to the frame 10 by two pair of generally L-shaped brackets 44. The respective members of the left hand pair of brackets 44 are positioned to the front and rear of the inverted U-shaped frame 42 with their outstanding legs 46 projecting outwardly to the left of the frame 10. Correspondingly, the respective members of the right hand pair of L-shaped brackets are positioned front and rear of the inverted U-shaped frame 42, with their horizontal legs projecting outwardly, or to the right, of the rectangular frame 10. A short horizontal stub shaft 48 is welded to each of the outer ends of each of the L-shaped brackets 46, and a grooved roller 50 is journaled on each of the horizontal stub shafts 48. The groove 52 of each grooved roller 50 receives one of the flanges of the T-section from which the inverted U-shaped frame member 42 is made. It will therefore be seen that the lower portion of the inverted U-shaped frame 42 is guided for vertical movement.

Correspondingly, the center sections of the L-shaped brackets 44 are also provided with short stub shafts 54 which project outwardly of the vehicle and which also journal grooved rollers 56. The horizontal leg of the inverted U-shaped frame member 42 is provided with a pair of vertical plates 60 which extend transversely, i. e. front and rear of the frame 42, and the side edges of which receive the grooves 58 of the grooved rollers 56. The top and bottom of the vertical plates 60 are stiffened by top and bottom gussets 62 and 64 respectively. The four rollers 52, and the four rollers 56 therefore restrain the inverted U-shaped frame member 42 against cocking movement relative to the rectangular frame 10. The inverted U-shaped frame member 42 is biased downwardly to force the wheels 36 into ground engagement by means of four tension springs, the top ends of which are fixed to the horizontal leg of the inverted U-shaped frame member 42, and the bottom ends of which are fixed to the horizontal legs of the L-shaped bracket 44. The upper ends of the L-shaped brackets 44 are held spaced apart by through bolts 68 each of which is provided with four jam nuts, respective ones of which are positioned against opposite sides of the L-shaped bracket. The bottoms of the L-shaped brackets are similarly spaced apart by two through bolts 72, having four jam nuts 74 each of which is positioned on a respective side of the L-shaped member. While it may not be necessary in all instances, the bottom legs of the inverted U-shaped bracket 42 are tied firmly together by a horizontal rod 76.

In the embodiment shown in the drawing, the seat 78 for the driver is positioned over the rear wheel 14, and the vehicle is steered by means of a vertical steering column 80, the lower end of which is journaled in the frame in a manner fixing the column 80 against all movement except rotation. A chain sprocket 82 is fixed to the steering column 80 at the same level that the sprocket 26 are fixed to the stub shafts and an endless chain 84 passes around the front of both sprockets 26. A pair of idlers 86 are positioned slightly rearwardly of the leading edge of the rear sprocket 26 with the individual idlers of the pair being positioned to either side of the rear sprocket 26. Two more pairs of idlers 88 are positioned adjacent the sprocket 82 with the respective members of the front pair of idlers 88 being positioned on opposite sides of the vehicle center line, and with the respective members of the rear pair of idlers being positioned on opposite sides of the vehicle center line. The endless chain 84 passes inwardly between the front pair of idlers 88 around the outside of the sprocket 82 and then passes between the rear pair of idlers 82 and around the back of the idlers 86. The chain 84 then passes over the front of the rear sprocket 86 and is kept taunt so that driving engagement is maintained with the sprocket 82 and with the front portions of each of the annular steering sprockets 26. It will now be seen that when the steering column 80 is rotated to the left, the front wheel will be turned to the left while the rear wheel will be turned to the right; and that when the steering column 80 is turned to the right, the front wheel is turned to the right and the rear wheel is turned to the left. The arrangement is such, that the front and rear wheels 12 and 14 can be rotated 360°, and that the rear wheel is always turned in the opposite direction to the front wheel 12 but in like amount. Since each of the front and rear wheels are power driven, the vehicle can pivot about any point desired; and when the wheels are turned 90° to the longitudinal center line of the vehicle, the vehicle pivots about a point half way between the wheels 12 and 14 to give what is called a "zero radius turn". When making such a "zero radius turn", the front of the vehicle moves sideways in one direction while the rear of the vehicle moves sideways in the other direction. When so pivoting, no skidding of the wheels is encountered, since each steerable wheel is driven in the direction it is moving to apply a pulling action on the frame. By way of comparison, the steering wheels of conventional vehicles require a pushing action from the frame. When making a "zero radius turn", the outrigger wheels are free to move forwardly or rearwardly as required, each being independent of the other, and of the motor driven wheels 12 and 14.

The wheels 12 and 14 can be power driven in any suitable manner, and as shown in the drawings, and as previously explained, are driven by hydraulic motors 28. The hydraulic pressure for the motor 28 is produced by a hydraulic pump 90 that is supported on the back side of a rectangularly shaped reservoir 92 from which the pump takes suction through a finned cooling tube, not shown. The pump 90 is driven by a small gasoline engine 94 by means of a V-belt 96. The discharge of the pump 90 passes through conduits, not shown, to a control valve 98 supported from the side of the rectangular frame 10 with its control lever 100 extending upwardly in front of the drivers seats 78. Pressure and return lines, not shown, proceed from the control valve 98 to each of the motors 28, so that the motors can be driven in either rotational direction, at various speeds, depending upon the setting of the control lever 100. The pressure lines from the control valve to the front motor 28 passes down through the tubular stub shaft 24 which supports the front wheel, and other lines proceed down the rear stub shaft 24 to the motor for the rear wheel. Suitable swivels, not shown, are provided in these lines, so that the wheels can be rotated 360° without rupturing the hydraulic lines.

It has previously been explained that the vehicle shown in the drawings is designed to support and drive a lawn mowing mechanism. In the embodiment shown in FIGS. 1 through 3 the mower is a rotary mower having a blade not shown that is driven by a pulley 102 which in turn is driven by a V-belt 104 which passes over a pulley 106 that in turn is secured to a shaft 108 that is driven by the engine 94. The blade of the rotary mower is housed within a pan-shaped mower housing 110 that in turn is supported midway between the wheels 12 and 14 from the L-shaped brackets 44. The mower housing can move upwardly by a controlled amount, but is restrained against front and rear movement. In the embodiment shown in the drawings, support rods, not shown, pass upwardly through four compression springs 112 which are interpositioned between the top of the mower housing 110 and the bottom of the L-shaped brackets 44. The front and rear edges of the mower housing are provided with rolled edges 114 for engaging and riding over obstructions, and in turn compressing the springs 112. It will be seen that the mower housing 110 is positioned between the outrigger wheels 36, and also between the drive wheels 12 and 14 so that any high spot of the terrain must be first traversed by one of the wheels by which the mower is surrounded. If the front wheel 12, for example, engages a rise in the terrain, it automatically raises the mower housing 110. Shortly thereafter the rise in the terrain will be engaged by the outrigger wheels 36 to automatically tip the vehicle and the mower housing 110 to conform to the general level of the terrain. Smaller obstructions or smaller rises in the terrain which are missed by the front or rear wheel as the case may be, may be first engaged by the rolled edge of the mower housing to cause a yielding of the compression springs 112.

Figure 4:
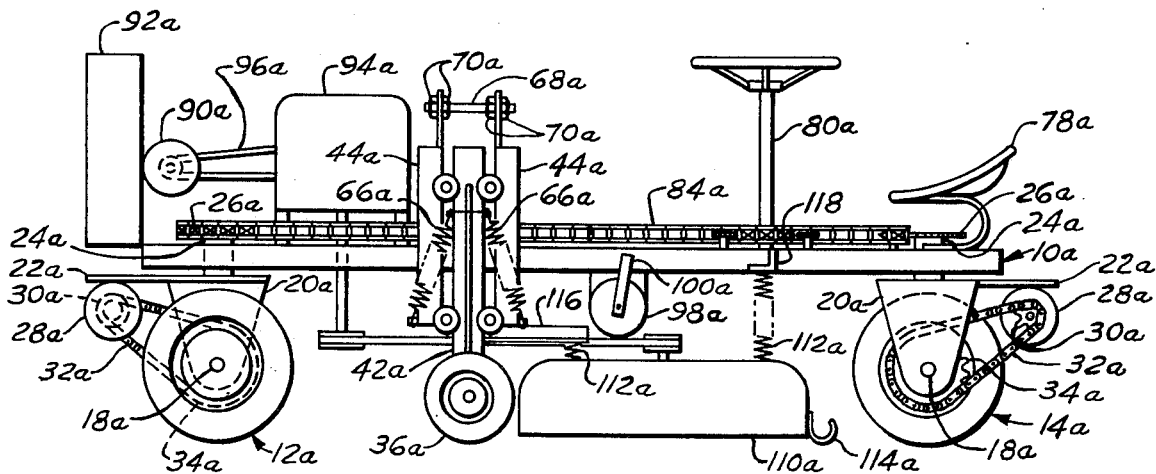
FIG. 4 is a side elevational view similar to FIG. 2 but showing another embodiment of the invention.

In some instances, it may be desired to have the outrigger wheels positioned adjacent the front of the mower housing so that the outrigger wheels will roll over obstructions before the obstruction is encountered by the mower housing, and so that the outrigger wheels can be made to lift the mower housing over the obstructions. Such an embodiment is shown in FIG. 4. Those portions of the embodiment shown in FIG. 4 which correspond to like portions of the embodiment shown in FIGS. 1 through 3 are designated by a like reference numeral characterized further in that a subscript $a$ is affixed thereto. The mower 110a is driven in the same manner as is the embodiment shown in FIGS. 1 through 3, but is supported from the L-shaped brackets 44a by means of a pair of rearwardly extending angle irons 116 so that the front edge of the mower housing 110a moves with the inverted U-shaped frame 42a which supports the outrigger wheels. The compression springs 112a are similar to those previously described and are used to support the mower housing 110a from the angle irons 116. The back of the mower housing 110a is supported from the rectangular frame 10a by angle iron brackets 118 fixed to the side of the frame. Through bolts, not shown, extending through compression springs 112a that are positioned between the angle brackets 118 and the mower housing 110a.

Figure 5:
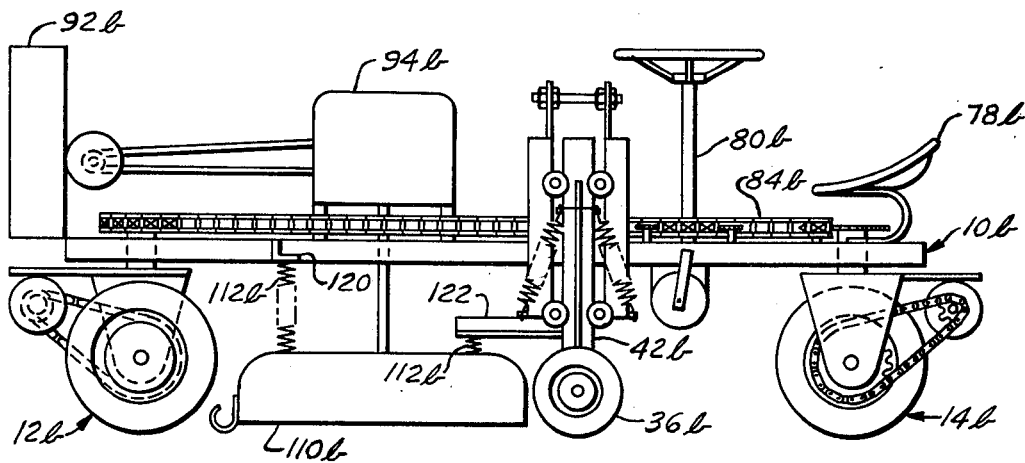
FIG. 5 is a side elevational view similar to FIG. 2 but showing still another embodiment of the invention.

In other instances, it may be desired to support the front of the mower housing from the rigid frame of the vehicle immediately behind the front power driven wheel. Such an arrangement is shown in FIG. 5 of the drawings. Those portions of the embodiment shown in FIG. 5 which correspond to portions previously described are designated by a like reference numeral characterized further in that a subscript $b$ is affixed thereto. The front of the mower housing 110b of the embodiment shown in FIG. 5 is supported from the frame 10b by through bolts, not shown, which are hung from angle brackets 120 which project outwardly from respective sides of the frame 10b. Compression springs 112b surround the through bolts to yieldably hold the through bolts extended. The rear of the mower housing 110b is supported from and guarded by the inverted U-shaped frame 42b which carries the outrigger wheels 36b. Forwardly extending angle iron brackets 122 are welded to the front of the frame 42b, and the rear of the mower housing is supported therefrom by means of through bolts, not shown, and compression springs 112b. The arrangement shown in FIG. 5 is also positioned so that the rotary blade of the mower is in line with the vertical drive shaft from the engine 94b. The vertical drive shaft contains universal joints, not shown. An advantage of the arrangement shown in FIG. 5 therefore is that the drive for the mower is appreciably simplified in that drive belts and pulleys are eliminated. It will be seen that in the arrangement shown in FIG. 5, the front of the mower housing is guarded by the front drive wheel 14b which is in line with the center of the housing, and the rear of the mower housing 110b is straddled and supported by the outrigger wheels 36b.

It will be seen that the structure of the various embodiments has been shown somewhat schematically in order to eliminate common details of construction that men skilled in the art can readily supply, and which have no part of the present invention. Elimination of such details has made for a quicker and easier understanding of the principles of the present invention.

It will also be apparent that the objects heretofore enumerated as well as others have been accomplished, and that there has been provided a vehicle capable of a "zero radius turn" having many uses, an important one of which is the support and drive for a rotary mower. It will be seen that the mower is "guarded" by the wheels of the vehicle, and that the mower can be supported in such fashion that it is given ground clearance by the main ground engaging wheels of the vehicle. It will be seen that both steerable wheels of the vehicle are arranged in tandem fashion, and are motor driven and are further turned in opposite directions. While the drawings show a single chain arrangement for turning the power driven wheels, it will be understood that other arrangements can be used, as for example, separate chains proceeding from the steering column to the respective steering sprockets of the front and rear wheels can be utilized.

While the invention has been described in considerable detail, we do not wish to be limited to the particular embodiments shown and described, and it is our intention to cover hereby all novel adaptations, modifications, and arrangements thereof which come within the practice of those skilled in the art to which the invention relates, and which fall within the purview of the following claims.

We claim:

1. A land vehicle comprising: a longitudinally extending frame having a longitudinally extending center line, front and rear power driven wheels generally on said center line and supporting said frame, means pivotally securing said wheels to said frame for rotation about generally vertical axes, a pair of stabilizer wheels respective ones of which are on opposite sides of said longitudinal center line, a rigid nonarticulated stabilizer frame extending transversely of said longitudinal frame and supporting said stabilizer wheels about axes fixed to said frame, and means biasing said rigid stabilizer frame downwardly relative to said longitudinally extending frame to hold the vehicle erect.

2. The vehicle of claim 1 wherein said rigid stabilizer frame is restrained by said longitudinally extending frame against all other than vertical movement.

3. The vehicle of claim 2 wherein said second mentioned means comprises a tension spring having its lower end fixed to said longitudinally extending frame and its upper end fixed to said stabilizer frame.

4. The land vehicle of claim 2 comprising a device for performing work on the terrain supported at least in part by said rigid stabilizer frame.

5. The vehicle of claim 4 wherein said device for performing work on the terrain is a mower.

6. The vehicle of claim 5 wherein said mower is supported by said rigid stabilizer frame generally in line with the axis of said stabilizer wheels.

7. The vehicle of claim 6 wherein said mower is supported by said rigid stabilizer frame for angular movement about the center line of said mower.

8. A vehicle for performing work relative to the terrain over which it is driven, said vehicle comprising: a longitudinally extending frame, front and rear power driven wheels pivotally connected to said longitudinally extending frame about respective generally vertical steering axes, a transverse rigid, unarticulated stabilizer frame secured to said longitudinal frame against all but up and down movement to support the frames in their relative positions while accomodating vertical movement of said rigid stabilizer frame, a pair of spaced apart stabilizer wheels fixed to said stabilizer frame about horizontal axes, a device for performing work on the terrain supported at least in part by said stabilizer frame, means operatively positioned between said frames for biasing said stabilizer wheels into ground engagement, and steering means for turning said front power driven wheel about its vertical steering axis in one direction while simultaneously turning said rear power driven wheel about its vertical steering axis in the opposite direction.

9. The vehicle of claim 8 wherein said device for performing work on the terrain is a lawn mower.

10. The vehicle of claim 9 wherein said lawn mower is fixed to said stabilizer frame with the center of the mower positioned generally between the axes of said stabilizer wheels.

11. The vehicle of claim 9 wherein the front part of said lawn mower is supported by said stabilizer frame at a position generally between said stabilizer wheels and means are provided at the back of said mower to maintain general clearance for the mower.

12. The vehicle of claim 9 wherein the rear part of said lawn mower is supported by said stabilizer frame, and means are provided for yieldably supporting the front part of said mower to said longitudinally extending frame behind said front power driven wheel.

13. A lawn mower comprising: a mower housing, a longitudinally extending vehicle frame over said housing, a rigid stabilizer frame extending transversely of said longitudinally extending frame, means connecting said frames to support the frames in their relative positions to each other while accommodating vertical movement of said rigid stabilizer frame, means supporting at least part of said mower housing from said stabilizer frame, a front power driven wheel forwardly of said mower housing, said front power driven wheel being steerable relative to said longitudinally extending frame, a rear power driven wheel rearwardly of said mower housing, said rear power driven wheel being steerable relative to said longitudinally extending frame, and steering means which simultaneously turns said front and rear power driven wheels in opposite directions to turn the mower about said stabilizer wheels.

14. The lawn mower of claim 13 wherein: said lawn mower is fixed to said stabilizer frame with the center of the mower positioned generally between the axes of said stabilizer wheels.

15. The lawn mower of claim 13 wherein: the front part of said lawn mower is supported by said stabilizer frame at a position generally between said stabilizer wheels and means are proved at the back of said mower to maintain general clearance for the mower.

16. The lawn mower of claim 13 wherein: the rear part of said lawn mower is supported by said stabilizer frame, and means are provided for yieldably supporting the front part of said mower to said longitudinally extending frame behind said front power driven wheel.

17. A lawn mower comprising: a mower housing, a longitudinally extending vehicle frame over said housing, a front frame support wheel forwardly of said mower housing, a rear frame support wheel rearwardly of said mower housing, there being an imaginary vertical plane passing through said front and rear support wheels, a pair of frame stabilizer wheels, respective ones of which are positioned on opposite sides of said mower housing, a rigid nonarticulated stabilizer frame extending transversely of said longitudinally extending frame and supporting said stabilizer wheels about axes fixed to said stabilizer frame, means connecting said stabilizer frame to said longitudinally extending frame in such manner as to prevent all other than relative vertical movement, and means yieldably supporting said mower housing from said vehicle frame generally at right angles to said imaginary vertical plane passing through said front and rear frame support wheels.

18. The lawn mower of claim 17 wherein one of said front and rear frame support wheels is both steerable and power driven.

19. The lawn mower of claim 17 wherein both of said front end rear frame support wheels are steerable and power driven.

* * * * *